A. C. HENDRICKS.
Vehicle Wheel.
No. 201,783.  Patented March 26, 1878.
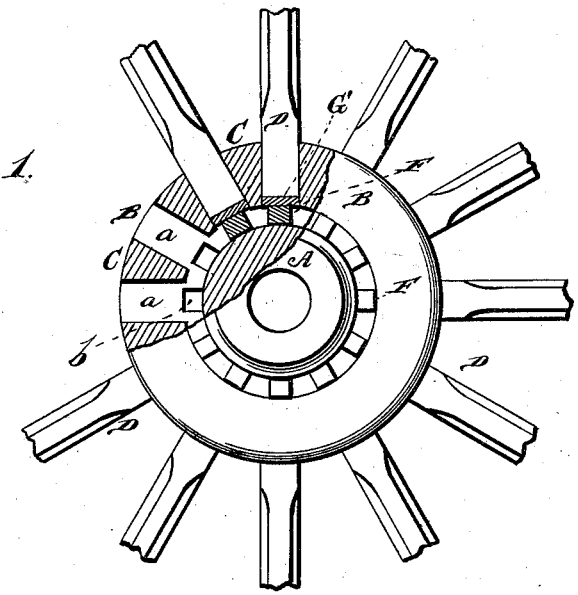
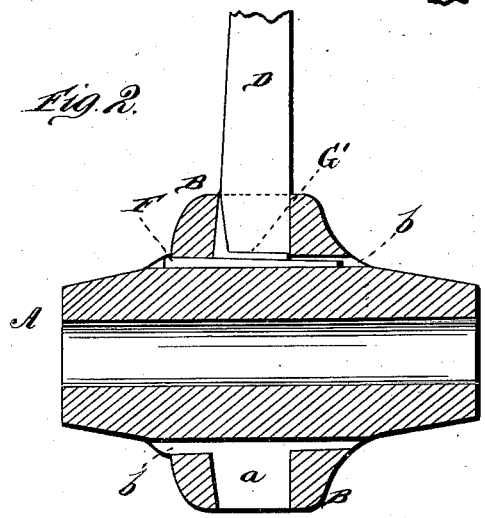
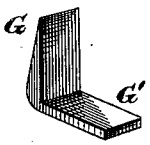
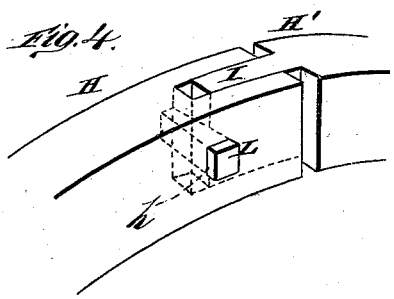

UNITED STATES PATENT OFFICE.

ADAM C. HENDRICKS, OF DUFFIELD'S, WEST VIRGINIA.

IMPROVEMENT IN VEHICLE-WHEELS.

Specification forming part of Letters Patent No. 201,783, dated March 26, 1878; application filed February 23, 1878.

*To all whom it may concern:*

Be it known that I, ADAM C. HENDRICKS, of Duffield's, in the county of Jefferson and State of West Virginia, have invented a new and valuable Improvement in Vehicle-Wheels; and I do hereby declare that the following is a full, clear, and exact description of the construction and operation of the same, reference being had to the annexed drawings, making a part of this specification, and to the letters and figures of reference marked thereon.

Figure 1 of the drawings is a plan view, partly in section, of my wagon-hub for vehicle-wheels. Fig. 2 is a sectional detail. Fig. 3 is a perspective view of the wedge, and Fig. 4 is a perspective view of the felly.

This invention relates to wheels for vehicles; and it consists in the construction of the hub and means for tightening the spokes, all as hereinafter more fully set forth.

The annexed drawing, to which reference is made, fully illustrates the invention.

A represents the hub proper, provided with two circumferential collars or flanges, B B, which are connected by the pieces or partitions C C, forming between them the mortises $a\ a$ for the spokes D D. The hub thus constructed is all cast or otherwise formed of one piece of metal, and through the flanges B B, under each mortise $a$, are made holes or apertures $b$, for the insertion of wedges F F, as hereinafter described.

In the construction of the hub the partitions C C between the flanges B B are so formed that the inner ends of the mortises $a$ will be wider than their outer ends.

In the bottom of each mortise $a$ is then inserted a metal wedge, G, provided with an arm, G', which rests on the hub A. The wedge G is made wider at its inner end than at the outer end, and by the application of this wedge in the mortise the configuration of the mortise becomes reversed—that is to say, its outer end becomes wider than the inner end.

The spoke D can now be driven into the mortise in the usual way, just as tight as desired, the arm G' of the wedge G lying against the inner end of the spoke when the spoke is driven entirely into the hub.

When the felly and spoke shrink so that the tire becomes loose it can be easily tightened by means of the wedges F F, which are driven through the apertures $b\ b$ in the flanges B B of the hub, and pass under the arms G' of the wedges G. Each wedge F thus forces the wedge G and the spoke D outward, making not only the spoke tight in the hub, but also tightening the tire.

It will readily be seen that by this means the spokes can be tightened at any time, no matter how little or how much the shrinkage has been, the wedges being driven in independently of each other as far as required to accomplish the desired object.

H H' represent the adjoining ends of two felly-sections. The end of the section H is forked to receive a lip or tongue, I, formed on or attached to the end of the section H'.

Through the section H are made slots $h$ for the insertion of a wedge-key, L, which bears against the end of the tongue I. By driving this key through the slots $h$, it will readily be seen that the felly will be more or less expanded, as required, to tighten the tire and compensate for any shrinkage of the felly.

What I claim as new, and desire to secure by Letters Patent, is—

1. The wheel-hub hereinbefore described, consisting of the hub proper, A, flanges B B, partitions C C, constructed to form the mortises $a\ a$ wider at the inner ends than the outer ends, with wedges G, the flanges B provided with the holes $b\ b$, and the detachable wedges F, substantially as and for the purposes herein set forth.

2. In combination with a hub having the spoke-mortises $a$ made larger at their inner ends than at the outer, the wedges G, formed with the arms G', and the wedges F, substantially as and for the purposes herein set forth.

In testimony that I claim the above I have hereunto subscribed my name in the presence of two witnesses.

ADAM C. HENDRICKS.

Witnesses:
CHAS. L. BARNHART,
JOHN F. BLACKMAR.